March 13, 1928.
K. G. KRIEGER
APPLIANCE FOR TEACHING ARITHMETIC
Filed April 15, 1927
1,662,503
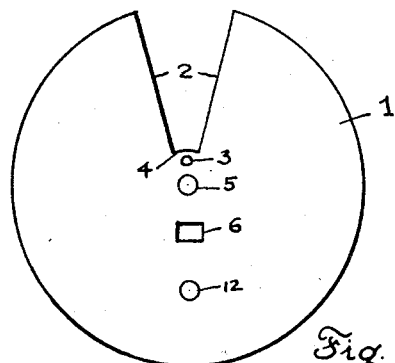
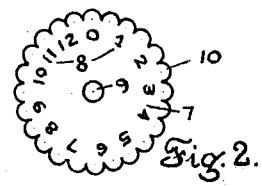
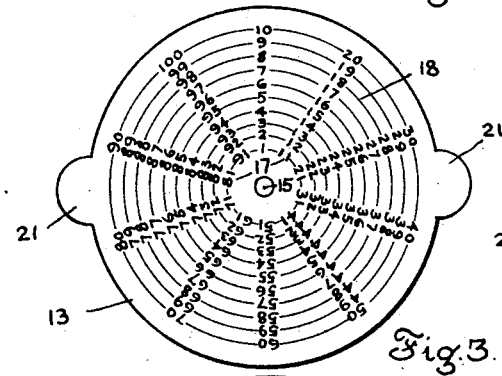
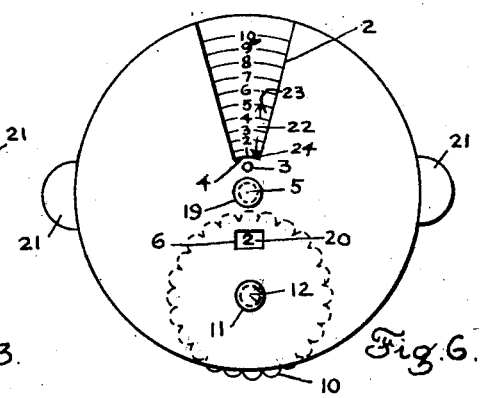
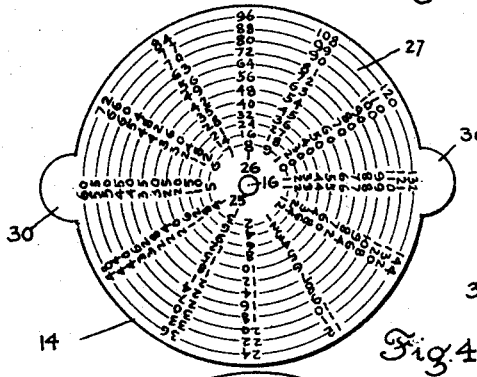
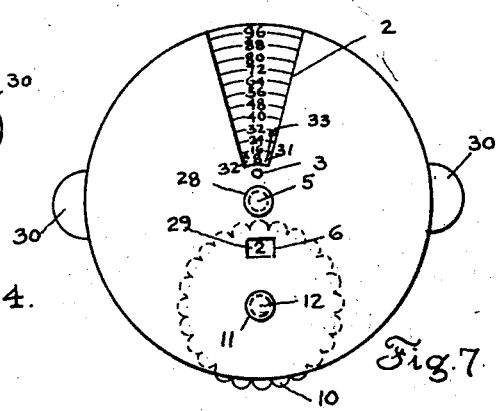
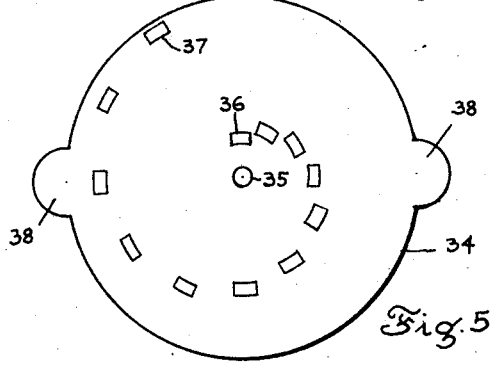
Inventor:
Kathryn G. Krieger
William H. Hauser
Attorney.

Patented Mar. 13, 1928.

1,662,503

UNITED STATES PATENT OFFICE.

KATHRYN G. KRIEGER, OF BALTIMORE, MARYLAND.

APPLIANCE FOR TEACHING ARITHMETIC.

Application filed April 15, 1927. Serial No. 184,080.

My invention relates to an appliance to be used in the classroom by both the teacher, who uses a large model mounted upon an easel, and the pupils, who hold a smaller model in their hands, to stimulate the solution of problems in addition, subtraction, multiplication, division by tactual as well as by visual and auditory association, which appliance consists of a plate, chart, two discs, and drill chart all but the charts being circular and of similar diameters and having certain features of construction and combination of parts mounted and operated in the manner and order as will be hereinafter described and claimed.

Attempts have been made hitherto to construct various mechanisms, appliances, and devices for instruction in arithmetic and other subjects or branches of learning but they have proved unsatisfactory, either because too cumbersome, too complicated, or too costly. Those devised especially for instruction in the combination of numbers mentioned hereinbefore have not been of great value because, primarily from a pedagogic standpoint, they admit of manipulation by the teacher solely of dials or similar objects which expose the answer. The process on the part of the pupil of association of the items of addition and the sum, or of the minuend, subtrahend and difference, or of the multiplicand, multiplier and product, or of the divisor, dividend and quotient by means of such devices is essentially the assimilation of visual sensations, and has been discovered by experience to be not nearly so permanent as when the operation requires positive intermediate mental and physical action. The present practice of teaching the foregoing elementary branches of arithmetic by oral demonstration is similarly defective, and, moreover, admits of the association of the problem with wrong conclusions.

The objects of my inventions, accordingly, are to provide the pupil with a device which he can himself manipulate, on which are designated numerals as hereinafter described, and which will aid him to a more quick and independent solution of such a contemplated arithmetical problem by compelling him to count an indicated number of concentric rings or circles from a given point to determine the answer, or to perform other manual acts. It is presupposed that the pupil can count and can distinguish and point out numerals. The pupil will thus be induced to accompany the mental operation of associating numbers or pure abstractions with some physical manipulation or effort. By such a process, the pupil will be taught the true and correct answer in the first instance before he may acquire erroneous impressions as under the existing methods of instruction, and will be taught to discover for himself the process of calculating abstractly.

A further object of my invention is to provide means whereby the teacher drills the pupil to quick and progressive reactions to the operations in addition, subtraction, multiplication and division; and a still further object is to provide a simple, durable, and practical device, both in construction and operation, and one inexpensive to manufacture from cardboard or other suitable material.

These and further objects will more fully appear in the following specification and accompanying drawings.

I have illustrated my invention in the following drawings, in which—

Figs. 1, 2, 3, 4, and 5 are detail plan views of one set of front plate, chart, discs, and drill chart which I employ.

Fig. 6 is a front elevation of my improved device, assembled, and illustrating the position of the discs in the problem of addition or subtraction.

Fig. 7 is a front elevation of my improved device, assembled, and illustrating the position of the discs in multiplication or division. In the drawings, in which similar reference characters designate corresponding parts in all figures, 1 represents a front plate which is constructed of heavy cardboard, or of other relatively light material of sufficient weight and strength to resist warping. The plate is flat, circular in shape, and is provided with a sector 2, of 30°, located centrally near the upper portion of the front plate, and the numeral 0 (reference numeral 3) is printed or written beneath the sector 2 and midway between its base 4 and eyelet 5 provided at the center of the front plate 1. A small rectangular sight opening 6 is located also on the front plate, opposite the sector and eyelet 5 and centrally near the central axis of the front plate.

In connection with the front plate I employ a chart 7, which is also constructed of the same material as the front plate, circular in shape, but whose diameter is slightly less than the radius of the front plate 1. This chart has designated thereon, on the front side, the numerals 0 to 12, inclusive, 8, preferably arranged in circular form, and reading from left to right in regular sequence, near the edge of chart 7, and is provided at its center with an eyelet 9. In the present embodiment of my invention, chart 7 is adapted to expose thru sight opening 6 by means of projections 10, equally spaced, beyond the periphery of front plate 1, permitting manipulation by the fingers of the operator and which are integral with chart 7, and is secured beneath the front plate 1 by means of an ordinary paper fastener 11 of the McGill type passing first thru the eyelet 12 of the front plate 1 and then thru the eyelet 9 of chart 7, as shown more plainly in Figs. 1, 2, 7 and 8.

In connection with the front plate, I provide a series of discs 13 and 14. Each disc is of substantially the same size and shape as the front plate, and is also constructed of the same material as the front plate, and is provided at its center with eyelets 15 and 16. In the present embodiment of my invention, disc 13 is used for auditory, visual and manual instruction in addition and subtraction, and has designated thereon, on its front side, radial series of numbers such as 17, ranging from 1 to 100 inclusive, in regular sequence and arranged along ten radii, equally spaced, the first radius ranging from 1 to 10 in regular sequence, the second radius on its right ranging from 11 to 20 in regular sequence, etc., the lowest figure in each radius forming an annular series of numerals, adjacent the center of disc 13. Disc 13 is provided, on its front side, with ten concentric rings or circles 18 also, separated by equal spaces, each circle passing thru the annular series of numerals thus formed. Disc 13 is adapted to expose thru sector 2 another item of the problem in addition, or the minuend, and the answer to said problems, and is secured beneath front plate 1 and chart 7, overlapping the chart 7, by means of a paper fastener 19 of the McGill type passing first thru the eyelet 5 of the front plate, and then thru eyelet 15 of the disc 13, as is shown more plainly in Figs. 1, 2, and 7.

With the device shown in the present embodiment and arranged in the manner and order thus described and shown in Fig. 7, it will be seen that by rotating chart 7 by means of the projections 10, any numeral 20, as, for instance, the numeral 2, which the teacher directs orally or by indicating on her device, be added or subtracted, may be made to appear in the sight opening 6, and that by rotating disc 13 by means of the tabs 21, integral with disc 13, any numeral 22 in the radial series of numerals, as, for instance, the numeral 3, the teacher may direct the pupil, as above, to add to the numeral 20, may be made to appear in the sector 2. To obtain the correct answer, the pupil will count away from the center on his device, towards the periphery in the upper portion of the front plate or disc 13, the number of circles indicated in the sight opening 6, commencing with the circle exposed in sector 2, in the next regular sequence from the numeral 22. Thus, the finger will point to the circle passing thru numeral 23, which bears the true answer. The process of counting circles is reversed in subtracting. The teacher indicating, as above, numerals 3 and 2, as the minuend and subtrahend, respectively, the pupils will rotate as above described in the process of addition, and count two circles toward the center of the plate or disc 13 commencing with the circle exposed in sector 2, in the next regular order from the numeral 22. Thus, the finger will point to the circle passing thru numeral 24, which bears the true answer.

In the present embodiment of my invention, disc 14 is used for auditory, visual, and manual instruction in multiplication and division by removing disc 13, and substituting it therefor, and has desginated thereon, on its front side, around its center an annular series of numerals such as 25, ranging preferably from 1 to 12, inclusive, and reading from left to right in regular sequence, equally spaced, and arranged in a radial series of numbers such as 26 located, on its front side, along the same radial axes as and containing multiples of the numerals 25 with which they are aligned, the least multiples being designated in an annular series adjacent its center. Disc 14 is provided, on its front side, with twelve concentric rings or circles 27 also, separated by predetermined equal spaces, having distances between them the same as have the circles on disc 13, each circle passing thru the annular series of numerals thus formed. Disc 14 is adapted to expose thru sector 2 the multiplicand or the divisor and dividend, and the answers, and is secured beneath the front plate 1 and chart 7, overlapping chart 7, by means of an ordinary paper fastener 28 of the McGill type, passing first thru the eyelet 5 of the front plate and then thru eyelet 16 of disc 14, as is shown more plainly in Figs. 1, 4, and 7.

With the device shown in the present embodiment arranged in the manner and order thus described and shown in Fig. 7, it will be seen that by rotating chart 7, by means of the projections 10, any numeral 29, as, for instance the numeral 2, which the teacher directs as above in the processes of addition and subtraction be multiplied, may be made to appear in the sight opening 6, and that by rotating disc 14, by means of tabs 30, any multiplicand in the annular series 31, as for instance, the numeral 8, may be made to appear in sector 2. To obtain the correct answer, the pupils will count away from the center of the device towards the periphery on the upper side of the front plate or disc 14, the number of circles indicated in the sight opening 6, commencing, however, in this operation, with the circle passing thru the multiplicand. Thus, the finger will point to the circle passing thru the numeral 32, which bears the true answer.

With the device shown in the present embodiment and arranged in the manner and order described in the preceding paragraph and as may be obvious from Fig. 7, it will be seen that by rotating chart 7, by means of the projections 10, any numeral, as for instance the numeral 8, the divisor, may be made to appear in the sight opening 6, and that by rotating disc 14, by means of tabs 30, the divisor 31 designated on the annular series of numerals 25 also, and any dividend 33 on the radial series of numerals 26, such as numeral 32, may be made to appear in sector 2. To obtain the correct answer the pupil will count away from the center towards the periphery on the upper side of the front plate or disc 14, commencing with the circle passing thru the divisor 31 to the circle passing thru the dividend 33, and the correct answer will be thus determined by the number of circles counted, to wit, in this case, four.

In connection with front plate 1, chart 2 and either disc 13 or 14, I employ a drill chart 34 which is substantially of the same size and shape as the front plate and discs 13 and 14, is also constructed of the same material as substantially the front plate and discs, and is provided with an eyelet 35 at its center and with a volute line of rectangular sight openings such as 36 and 37, each opening 36 being of equal size and located in the radial line of one of the numerals 26, the openings 36 being located at predetermined varying distances from the numerals 25 with which they are aligned. That opening 36 which is in alignment with the lowest numeral 25 is nearest the center of the drill chart 34, and that opening 37 which is aligned with the highest numeral 25 is farthest from the center of the drill chart 34, near the periphery thereof, and encircles eyelet 35 completely, as shown in Fig. 5. Drill chart 34 is adapted to expose any one numeral in the annular or radial series of numerals on discs 13 or 14 thru sector 2, and to conceal all other numerals on the annular or radial series on discs 13 or 14, and is secured immediately beneath front plate 1 and chart 7, overlapping chart 7, and is superimposed upon disc 13 or 14 by means of an ordinary paper fastener of the McGill type passing first thru eyelet 5 of the front plate 1, eyelet 35 of drill chart 34, and eyelet 15 or 16 of disc 13 or 14, respectively. By manipulating the projections 10, and tabs 38 or 21 or 30, such numerals as the teacher may desire may be made to appear on her mounted device in sight opening 6 and sector 2. By rotating the drill chart the pupils will be drilled to calculate abstractly the various operations by combining the exposed numeral on any annular or radial series with the numeral in the sight opening, without the aid of the circles or the process of counting.

In accordance with the provisions of the patent statutes, I have described the principle of my invention, together with the appliance which I now consider to represent the best embodiment thereof; but I desire to have it understood that the appliance shown is merely illustrative and that the invention may be carried out in other ways.

Having now described my invention, what I claim as new and desire to secure by Letters Patent, is:

1. An arithmetic instruction appliance, having a circular front plate with two differently shaped openings therein, centrally and diametrically disposed in the upper and lower portions thereof, a chart whose diameter is less than the radius of said plate and on which are numerals printed in regular sequence from left to right in an annular line near its edge, a circular disc on which are equally spaced annular and radial series of numerals printed in regular sequence ranging along the radii from left to right and circles equally spaced passing through said annular series of numerals, means whereby the said chart may be secured beneath said plate, and the said disc may be secured beneath both plate and chart and overlap said chart, means whereby said chart may be rotated to expose any addend or subtrahend of the problem thereon in the lower opening of said plate, means whereby said disc may be rotated to expose any addend or minuend of the problem and circles in the upper opening of said plate, whereby the circles passing through said numerals may be counted to determine the correct answer.

2. An arithmetic instruction appliance, having a circular front plate, with two differently shaped openings therein, centrally and diametrically disposed in the upper and lower portions thereof, a chart whose diameter is less than the radius of said plate and on which are numerals printed in regular sequence from left to right, in an annular line near its edge, a circular disc on which are equally spaced annular series of numerals printed in regular sequence from left to right, and an equally spaced radial series of numerals printed on the same radial axis and in alignment with said annular series and containing multiples thereof, and circles equally spaced passing thru said annular and radial series of numerals, means whereby the said chart may be secured beneath said plate, and the said disc may be secured beneath both plate and chart and overlap said chart, means whereby said chart may be rotated to expose any multiplier or divisor of the problem thereon in the lower opening of said plate, means whereby said disc may be rotated to expose any multiplicand or divisor and dividend on the annular series of said disc and circles thereon in the upper opening of said plate, whereby the circles passing through said numerals may be counted to determine the correct answer.

3. An arithmetical instruction appliance, having a circular front plate, with two differently shaped openings therein, centrally and diametrically disposed in the upper and lower portions thereof, a chart whose diameter is less than the radius of said plate and on which are numerals printed in regular sequence from left to right, in an annular line near its edge, a circular disc on which are equally spaced annular series of numerals printed in regular sequence from left to right, and an equally spaced radial series of numerals printed on the same radial axis and in alignment with said annular series, a drill chart on which are equally sized openings arranged in a volute line in alignment with the annular series of numerals in said disc, at varying distances therefrom and in the radial line of the radial series of numerals, the said opening nearest the center of said drill chart being in alignment with the lowest numeral in the annular series, and the opening farthest from the center of said drill chart being in alignment with the highest numeral in the annular series, and completely encircling the center of said drill chart, means whereby the said chart may be secured beneath the said plate, and the said drill chart secured beneath both plate and chart, and overlap said chart, and be superimposed upon said disc, means whereby said chart may be rotated to expose any figure thereon in the lower opening of said plate, means whereby said drill chart or disc may be rotated to expose any and conceal all other figures in the annular or radial series of said disc in the upper opening of said plate, whereby drill may be had, in the calculation of various operations of elementary arithmetic.

4. An arithmetic instruction device, having a plate with two centrally and diametrically disposed and differently shaped openings in the upper and lower portions thereof cooperating with a chart on which are printed in regular sequence numerals denoting one item of a problem in addition, subtraction, multiplication or division, and cooperating with a disc on which are printed numerals and circles passing therethrough whereby every problem presented has three terms, two of which are known and third of which is ascertained by counting said circles.

KATHRYN G. KRIEGER.